Patented Dec. 15, 1942

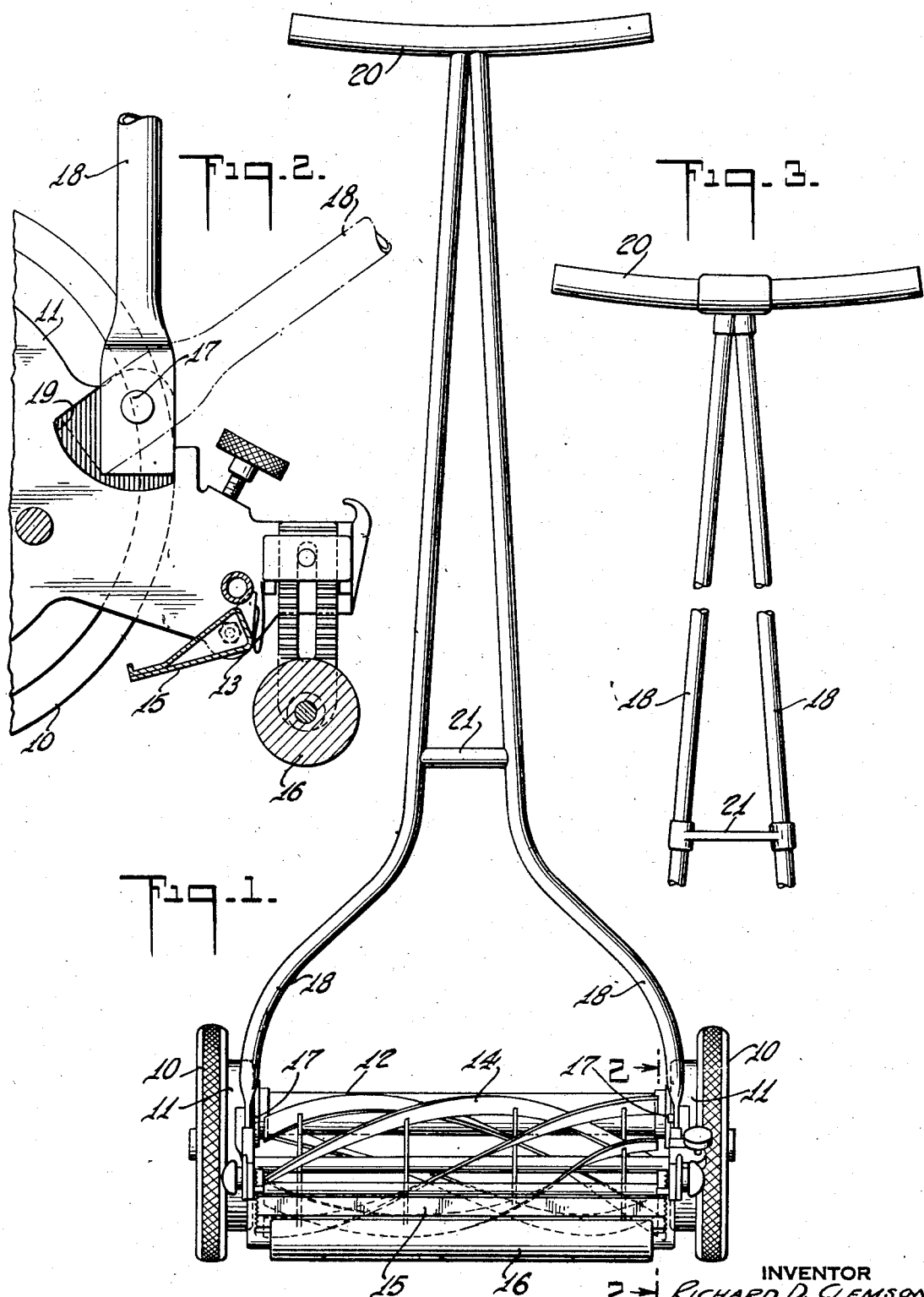

2,305,138

UNITED STATES PATENT OFFICE 2,305,138

MOWER

Richard D. Clemson, Middletown, N. Y., assignor to Clemson Bros., Inc., Middletown, N. Y., a corporation of New York Application February 14, 1939, Serial No. 256,379

5 Claims. (Cl. 56—249)

This invention relates to a mower and more particularly to a lawn mower of the type having a cutting mechanism carried and driven by a pair of wheels with a handle which, when in use, is extended behind the mower for pushing it over the lawn.

It is an object of the invention to provide a mower handle and connection which is easy of attachment and detachment, but is secure when in use.

Another object of the invention is to provide a mounting for the handle such that when not in use it can be left in an upright position where it will be out of the way.

Another object of the invention is to provide a hand mower in which maximum use is made of the width of the mower for actual cutting and the handle and its connection do not add to the width required.

Another object of the invention is to provide a handle for mowers and the like which is better adapted to the use required of it.

Another object of the invention is to provide a handle for mowers and the like which is adapted not only for pushing the mower when in use but also for convenient carrying of the mower from place to place.

Other objects and advantages of my invention will be apparent from the following specification and the accompanying drawing.

In the drawing, I have shown and described a preferred embodiment of my invention and various modifications thereof; but it is to be understood that these are not intended to be exhaustive nor limiting of the invention, but on the contrary are given for purposes of illustration in order that others skilled in the art may fully understand the invention and the principles thereof and the manner of applying it in practical use so that they may modify and adapt it in various forms, each as may be best suited to the conditions of a particular use.

In the drawing:

Figure 1 is a view in rear elevation of a mower embodying my invention with the handle in upright position;

Figure 2 is a view in cross section taken on the line 2—2 of Figure 1;

Figure 3 is a fragmentary view in elevation of another handle embodying my invention.

Referring first to Figure 1, I have shown there a mower having a wheel 10 mounted on a frame consisting of the side members of housings 11, a tubular strut member 12 and the back 13 of the bed knife. Mounted in the frame and between the wheels is the cutter mechanism consisting of the rotary reel 14 and bed knife 15. By use of a ball bearing mounting of the reel in the side frame members 11 a further bracing and, therefore, an increased rigidity is secured for the frame. The reel 14 is rotated by suitable transmission means, (not shown) ordinarily gearing, contained within the housings 11. At the rear of the machine a ground roller 16 is ordinarily provided to determine the height of cut and to balance the mechanism on the wheel axle.

According to my invention I have provided on the side frame members 11 and behind the housing for the transmission mechanism pivot pins 17 for engaging the longitudinal side arms 18 of the handle; and around these pivot pins 17 I have formed in the side frame members 11 arcuate recesses 19.

The positioning of the pivot pin 17 is as shown adapted to reduce or prevent "bobbing" and "bucking" of the mower in accordance with the invention described and claimed in my Patent No. 2,152,278, dated March 28, 1939, which, being no part of the present invention, need not be further described here.

According to the present invention, these pins are mounted behind the housings 11 and outwardly with respect to the inner faces of said housings so that these pins consume no part of the width of the mower. On the contrary, it will be observed that the ends of the fly knives on the reel operate close to the inner faces of the housing members 11 without interference from the pivot pins 17.

The arcuate recesses 19 are formed so that the upper side of each engages the lower side of the handle member 18 when the handle is in its lowermost operating position, i. e., only a little above horizontal. Thus, if one leaves the machine for a short time where it is being operated, the handle will remain at a convenient height to grasp when one returns and proceeds with the mowing.

The other side of this recess 19 is positioned so that it is engaged by the other side of the member 18 when the handle is just forward of the dead-center position. Thus, when one wishes to put the mower away in a small space it is not necessary to invert the machine and lean it against the wall with consequent scratching or marring of the wall as is the case with mowers heretofore in common use, but instead the handle is merely swung forward to the foremost position where it will be held upright by gravity.

The handle itself consists of the side members 18 already referred to, a cross member 20 at the opposite end which serves as the handle proper, being of a size and form adapted to be comfortably grasped by a man's hand when the mower is in use, and, about two-thirds of the way down the handle at a height a little below the height of a man's hand when hanging free, a strut 21 which serves both to brace the side members and to provide a convenient handle for carrying the mower from place to place.

The handle is engaged and disengaged from the handle proper by slipping one of the sides 18 onto one of the pins 17 and then springing the ends of the arms 18 together sufficiently so that the other side may clear the other pivot pin 17 and slip onto it. To make this possible, the side arms 18 of the handle should be sufficiently resilient so that this springing together can be effected by the strength of an ordinary man's arms; these members 18, however, should be sufficiently strong so that there is no danger of their being bent permanently beyond their elastic limit by a man attempting to pull them together. I have also found it advantageous that they should be sufficiently rigid so that, when in place, they engage the pivot pins 17 with some clearance, but only a little clearance, from the outer faces of the arcuate recesses 19.

By reason of this construction and the rigid construction of the frame, the handle remains securely engaged during all normal operation and cannot be wrenched off from the pivot pins 17, but nevertheless it can be easily removed and replaced, which is an important advantage of my invention, particularly for shipment of the machine, for carrying from place to place, e. g., in an automobile, and for storage, in all of which cases a permanently connected handle may be a serious inconvenience.

The handle as shown in Figs. 1 and 2 may be made of steel tubing with welded joints, thus providing a light strong and resilient—though almost rigid—construction of pleasing appearance. Such welding, however, is an expensive operation.

In Fig. 3, I have shown an alternative construction which I have found to afford substantial advantage.

In the example illustrated in Fig. 3 the joints between the several sections of tubing are made by deeply knurling or otherwise roughening or cutting or punching a portion of each tube near the joint and the die-casting a splicing tube over the adjacent parts of the steel tubes which are to be joined, the die-cast metal being flowed into the roughened, cut or punched areas so as to be keyed to the steel tubes.

The aesthetic external appearance of the handle as shown is the subject of the Design Patent No. 118,156. I have found this suitable for my present use but it will be understood, of course, that the invention will be embodied in other forms with straight diverging side members or different curves.

What I claim is:

1. A lawn mower having a rigid frame and a handle pivoted thereon, which is characterized by an arcuate recess formed in each side of the frame, said arcuate recess being opened upwardly and to the rear with a fixed pin positioned axially in the recess and a handle having ends adapted to swing in the arcuate recess and having holes therein near their ends fitted to said pins as pivots for said swinging movement, the one side of the arcuate recess corresponding in angular position to that assumed by a part of the handle in a lowermost operating position and lying in the arcuate path of said part and the other side corresponding in angular position to that assumed by a part of the handle in an upright position beyond dead center and lying in the arcuate path of said part whereby it will be securely held in said upright position by gravity.

2. In a lawn mower of the type having a rotary reel, driving mechanism for rotating the reel and wheels at opposite ends of the reel, the combination of a handle having a forked end, a frame adapted to carry the reel and provided with housing members close to the ends of the reel and adapted to house the driving mechanism, and said frame having recesses in the inner faces of said housings, said recesses opening upwardly and to the rear and the ends of the handle extending into the recesses, and a pivotal connection in said recesses for each of said handle ends on which the handle is mounted for limited rotation.

3. The combination as defined in claim 2 in which at least one of the recesses is arcuate with angularly related sides adapted to engage opposite sides of the handle respectively, one side corresponding to the angular position assumed by the side of the handle when in a lowermost operating position, and the other corresponding to the angular position assumed by the other side of the handle when in an approximately vertical position of rest beyond vertical dead center.

4. The combination as defined in claim 2 in which at least the forked end of the handle is of a stiffly resilient material permanently formed in said forked form and is engaged with the frame in said recesses by pins freely slidable axially with respect to one of the members engaged thereby and fixed to the other transverse to the axis of the handle and to the ends of said forked portion thereof, whereby said handle is removable from said pins and said recesses by transverse flexing of said forked end thereof.

5. In a lawn mower including side frames rigid against appreciable deformation in use, a handle construction comprising, a cross bar, two stiffly resilient hollow tubular portions depending therefrom in continuously divergent relationship and terminating in a fork, means for holding said portions in spaced relation intermediate their ends, said means being located nearer those ends of the portions which define a fork than the cross bar, the tines of said fork being spaced in repose for engagement against the rigid frames of the mower, means for effecting a pivotal connection between each tine and the respective side frame, said means each comprising a coacting stud and apertured element on a common axis, at least one of said means being of lesser axial length than the elastic flexing limit of said tines, whereby said tines may be removed from or engaged with the frame by manual elastic flexing of the forked end of the handle to cause relative axial movement between the elements of said assemblies.

RICHARD D. CLEMSON.